United States Patent
Prati (10) Patent No.: US 9,528,277 B2
(45) Date of Patent: Dec. 27, 2016

(54) PREFABRICATED ELEMENT FOR FLOORS OR FLOOR BASEBOARDS

(71) Applicant: PRATI GROUP S.P.A., Bosco di Scandiano (Reggio Emilia) (IT)

(72) Inventor: Andrea Prati, Reggio Emilia (IT)

(73) Assignee: PRATI GROUP S.P.A., Bosco di Scandiano (IT)

( * ) Notice: Subject to any disclaimer, the term of this patent is extended or adjusted under 35 U.S.C. 154(b) by 0 days.

(21) Appl. No.: 14/438,548

(22) PCT Filed: Sep. 20, 2013

(86) PCT No.: PCT/EP2013/069555
§ 371 (c)(1),
(2) Date: Apr. 24, 2015

(87) PCT Pub. No.: WO2014/063872
PCT Pub. Date: May 1, 2014

(65) Prior Publication Data
US 2015/0292217 A1    Oct. 15, 2015

(30) Foreign Application Priority Data

Oct. 26, 2012  (DE) .................... 20 2012 104 127 U (51) Int. Cl.
*E04B 2/30*      (2006.01)
*E04F 15/02*    (2006.01)
(Continued)

(52) U.S. Cl.
CPC .......... *E04F 15/02044* (2013.01); *B32B 3/04* (2013.01); *B32B 5/024* (2013.01); *B32B 5/08* (2013.01);
(Continued)

(58) Field of Classification Search
CPC .................... E04F 15/02155; E04F 15/02183; E04F 2015/02094; E04F 2201/0517
(Continued)

(56) References Cited

U.S. PATENT DOCUMENTS 3,856,611 A    12/1974   Markley
4,154,172 A *  5/1979    Curtis, Jr. .................... 105/422
(Continued)

FOREIGN PATENT DOCUMENTS

CN    2546556 Y      4/2003
CN    101054853 A   10/2007
(Continued)

OTHER PUBLICATIONS

International Search Report and Written Opinion of the International Searching Authority Application No. PCT/EP2013/069555 Completed: Feb. 21, 2014; Mailing Date: Feb. 28, 2014 9 pages.

*Primary Examiner* — Chi Q Nguyen
(74) *Attorney, Agent, or Firm* — St. Onge Steward Johnston and Reens (57) ABSTRACT

A prefabricated element or floors or floor baseboards is described that includes a rigid base having an upper surface and two opposed longitudinal lateral surfaces, the upper surface and lateral surfaces being covered by a layer made of vinyl fabric. A modular floor tile is also described that includes a plurality of the prefabricated elements mounted on a rigid support. The invention enables an outdoor decorated wood flooring with no need of maintenance to be realized.

15 Claims, 6 Drawing Sheets

(51) Int. Cl.
*B32B 3/04* (2006.01)
*E04F 15/04* (2006.01)
*E04F 15/10* (2006.01)
*B32B 5/02* (2006.01)
*B32B 5/08* (2006.01)
*B32B 7/12* (2006.01)
*B32B 21/02* (2006.01)
*B32B 21/10* (2006.01)
*B32B 27/12* (2006.01)

(52) U.S. Cl.
CPC ............... *B32B 7/12* (2013.01); *B32B 21/02* (2013.01); *B32B 21/10* (2013.01); *B32B 27/12* (2013.01); *E04F 15/02183* (2013.01); *E04F 15/02194* (2013.01); *E04F 15/043* (2013.01); *E04F 15/105* (2013.01); *E04F 15/107* (2013.01); *B32B 2262/0238* (2013.01); *B32B 2262/0253* (2013.01); *B32B 2262/0276* (2013.01); *B32B 2262/101* (2013.01); *E04F 2015/02083* (2013.01); *E04F 2015/02094* (2013.01); *E04F 2201/0138* (2013.01); *E04F 2201/021* (2013.01); *E04F 2201/096* (2013.01)

(58) Field of Classification Search
USPC ................... 52/177, 480, 581, 586.1
See application file for complete search history.

(56) References Cited

U.S. PATENT DOCUMENTS

| | | | |
|---|---|---|---|
| 4,885,882 A | 12/1989 | Forshee | |
| 5,030,502 A * | 7/1991 | Teare | B32B 13/14 428/192 |
| 5,280,692 A * | 1/1994 | Patey | E04B 5/12 52/58 |
| 5,351,458 A * | 10/1994 | Lehe | E04B 5/10 119/529 |
| 5,613,339 A | 3/1997 | Pollock | |
| 5,913,784 A * | 6/1999 | Hite | 52/177 |
| 6,044,598 A | 4/2000 | Elsasser et al. | |
| 6,453,630 B1 * | 9/2002 | Buhrts | E04B 5/12 52/177 |
| 7,908,812 B2 * | 3/2011 | Eberle, III | 52/489.1 |
| 8,919,068 B2 * | 12/2014 | Wright | E04F 15/02183 52/302.1 |
| 2001/0027829 A1 * | 10/2001 | Crout | 144/353 |
| 2002/0051680 A1 * | 5/2002 | Albanese | 403/388 |
| 2002/0095897 A1 * | 7/2002 | Summerford | 52/489.1 |
| 2003/0136070 A1 * | 7/2003 | Ku | 52/403.1 |
| 2004/0020136 A1 * | 2/2004 | Hauck | 52/11 |
| 2004/0045244 A1 * | 3/2004 | Hafner | 52/489.1 |
| 2004/0248489 A1 * | 12/2004 | Hutchison et al. | 442/187 |
| 2005/0028469 A1 * | 2/2005 | Grohman | 52/480 |
| 2005/0178071 A1 | 8/2005 | Wood | |
| 2006/0156640 A1 | 7/2006 | Thomas | |
| 2006/0283122 A1 * | 12/2006 | Burgess et al. | 52/480 |
| 2007/0092707 A1 | 4/2007 | Anderson et al. | |
| 2007/0234670 A1 * | 10/2007 | Martel | 52/410 |
| 2007/0289249 A1 * | 12/2007 | Martel | 52/715 |
| 2008/0279654 A1 * | 11/2008 | Deschamps | 411/457 |
| 2010/0132276 A1 * | 6/2010 | Landry | E04F 15/00 52/177 |
| 2010/0146900 A1 * | 6/2010 | Holland | E04F 15/02 52/650.3 |
| 2010/0205895 A1 * | 8/2010 | Orchard | 52/712 |
| 2011/0067335 A1 * | 3/2011 | Gibson et al. | 52/489.2 |
| 2011/0167744 A1 * | 7/2011 | Whispell | E04F 15/02 52/309.1 |
| 2011/0203200 A1 * | 8/2011 | Marquardt et al. | 52/220.1 |
| 2012/0110944 A1 * | 5/2012 | Hess | 52/582.1 |
| 2013/0104493 A1 * | 5/2013 | Orchard | 52/704 |
| 2014/0007526 A1 * | 1/2014 | Wright | E04F 15/02183 52/127.4 |
| 2014/0096469 A1 * | 4/2014 | Fountain | 52/650.3 |
| 2014/0215944 A1 * | 8/2014 | Husler | 52/302.1 |
| 2014/0363621 A1 * | 12/2014 | Ngo | E04B 1/66 428/119 |
| 2015/0096256 A1 * | 4/2015 | Lam | E04F 15/02044 52/582.1 |

FOREIGN PATENT DOCUMENTS

| | | |
|---|---|---|
| CN | 201437628 U | 4/2010 |
| DE | 202012000284 U1 | 5/2012 |
| WO | 2006079054 A2 | 7/2006 |
| WO | 2007060392 A1 | 5/2007 |

* cited by examiner

PREFABRICATED ELEMENT FOR FLOORS OR FLOOR BASEBOARDS

BACKGROUND OF THE INVENTION

The invention relates to a prefabricated element for floors or floor baseboards and to a floor arrangement that includes said prefabricated element.

Specifically, but not exclusively, the element and the floor arrangement can be used in outdoor areas.

The state of the art includes a prefabricated modular element for floors comprising a rigid base having an upper surface, a lower surface, two opposed lateral surfaces connecting the upper surface with the lower surface, and a layer made of vinyl fabric covering the upper surface.

DE 20 2012 000 284 U1 discloses an example of such an element, which is provided at its edges with means for connection to identical elements.

SUMMARY OF THE INVENTION

An object of the invention is to make a prefabricated element, particularly for floors or floor baseboards, wherein the need of maintenance is reduced.

An advantage is to realize a prefabricated element, particularly for floors or floor baseboards, which has a great resistance outdoors.

An advantage is to render available a prefabricated element, particularly for floors or floor baseboards, which has relatively high insulating properties.

An advantage consists of the possibility of easily laying decorative decks or floors of various patterns.

An advantage is to provide a prefabricated element, particularly for floors or floor baseboards, which is able to provide floors with optimal comfort properties.

An advantage is to enable a floor with great resistance to UV rays and/or atmospheric agents and/or with anti-scratch and/or anti-slip properties to be realized.

An advantage is to provide a modular element for laying an acoustic absorbing flooring.

An advantage is to provide a floor arrangement that includes one or more of said prefabricated elements.

Such objects and advantages and still others are all achieved by the element and the floor arrangement according to one or more of the claims set out below.

According to an embodiment of the invention, a prefabricated element for floors or floor baseboards has a rigid base which comprises a top layer of vinyl fabric and which is covered at one or both of its longitudinal edges with lateral layer(s) of vinyl fabric. The rigid base is provided with a single piece layer of vinyl fabric which covers the top and one or both of its longitudinal edges. The rigid base is provided with two or more distinct pieces of layer of vinyl fabric which cover the top and one or both of its longitudinal edges.

According to an embodiment of the invention, a floor arrangement comprises a rigid support on which one or more of said prefabricated elements are mounted.

BRIEF DESCRIPTION OF THE DRAWINGS

The invention can be better understood and implemented with reference to the attached drawings showing embodiments thereof by way of non-limiting examples. The practical embodiments are shown schematically in only illustrative and not restrictive manner. Analogous items of different examples have been indicated with the same reference numbers for sake of clarity and simplicity.

DETAILED DESCRIPTION OF THE INVENTION

Figure 1:
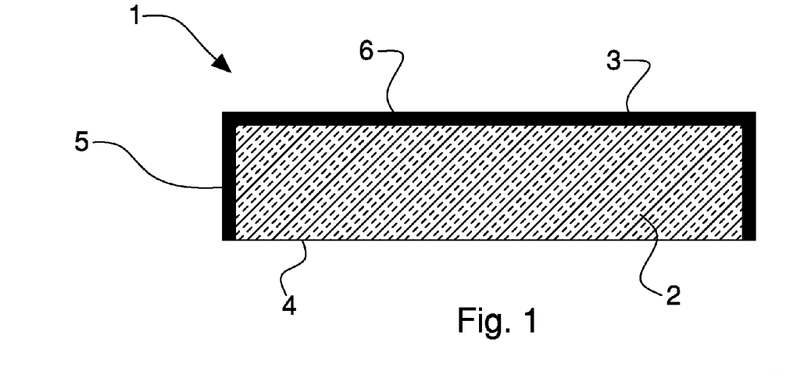
FIG. 1 is a schematic section of an example of an element made according to the invention.

With reference to FIG. 1, with 1 there has been indicated overall a prefabricated element for floors or floor baseboards. The prefabricated element 1 comprises a rigid base 2 having an upper surface 3, a lower surface 4 and at least two opposed longitudinal lateral surfaces 5 connecting the upper surface 3 with the lower surface 4.

The upper surface 3 is covered by a layer 6 made of vinyl fabric (woven vinyl). At least one of the (longitudinal) lateral surfaces 5 is covered by the layer 6 made of vinyl fabric. In the specific example, the two opposed lateral surfaces 5 are both covered by the layer 6 made of vinyl fabric. In other examples (not shown), only one lateral surface is covered by a vinyl fabric layer, in particular when the elements 1 are used for floor baseboards. A single piece of a layer 6 made of vinyl fabric covers, as in the specific example, the upper surface 3 and the two opposed lateral surfaces 5. In other examples a single piece of a vinyl fabric layer covers the upper surface and only one of the two lateral surfaces.

The rigid base 2 is at least partly made of one or more of the materials selected in the group consisting of: wood, wood-plastic composite(s) or other natural fiber plastic composite(s), vinyl composition tile, composite(s) of PVC with or without fibre, ABS, XPS, or any composite material made by the composition of these materials.

The vinyl (woven vinyl) that forms the covering layer 6 comprises fabric yarns made of plastic reinforced with threads made of polyester or glass fiber. In particular the yarns have an outer layer of plastic and a core of a plurality of reinforcing threads. The yarns is made of PVC and/or PE and/or PP. The vinyl (woven vinyl) is coupled to the rigid base 2 by an adhesive, for example by a polyurethane glue.

The layer 6 formed by the vinyl has a thickness of between 0.5 and 2 mm and a basis weight of between 0.2 and 1 kg/m$^2$. However layers with other thicknesses and basis weights are used.

The prefabricated element 1 is construed as an element of elongated shape. In particular the element 1 has any suitable length for making floors or floor baseboards, such as lengths between 1000 and 3000 mm, or other lengths. Each element 1 is cut to the desired length according to the need.

The section (schematically shown in FIG. 1) of the element 1 has any suitable width and height (thickness) for making floors or floor baseboards, such as width between 50 and 300 mm, or other widths, and heights (thicknesses) between 10 and 30 mm, or others heights.

Figure 8:
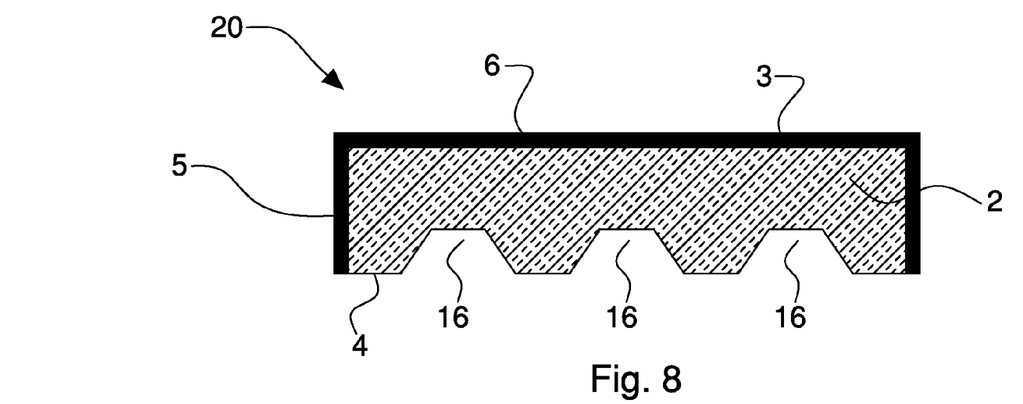
FIG. 8 is a schematic section of a version of the element shown in FIG. 1.

With reference to FIG. 8, with 20 there has been indicated overall a version of the prefabricated element 1 shown in FIG. 1. The prefabricated element 20 differs from the element 1 in that some longitudinal grooves 16 are obtained in the lower surface 4. In the embodiment shown, the prefabricated element 20 comprises three longitudinal grooves 16 which are parallel one another and also parallel to the lateral surface 5. The longitudinal grooves 16 have a cross section that is trapezoidal-shaped. Owing to the longitudinal grooves 16 the prefabricated element 20 is lighter than element 1 and can therefore be manufactured employing a reduced amount of material than the amount required for manufacturing the element 1. Accordingly, the prefabricated element 20 is manufactured by saving material and thus has a lower manufacturing cost. It is thus apparent for the person skilled in the art that the prefabricated element 20 may comprise a number of longitudinal grooves 16 different from three (e.g. one, two, four or even more grooves), which grooves 16 may have a cross section different from the trapezoidal one shown in the figure (e.g. prismatic or semi-circular cross shape).

Figure 2:
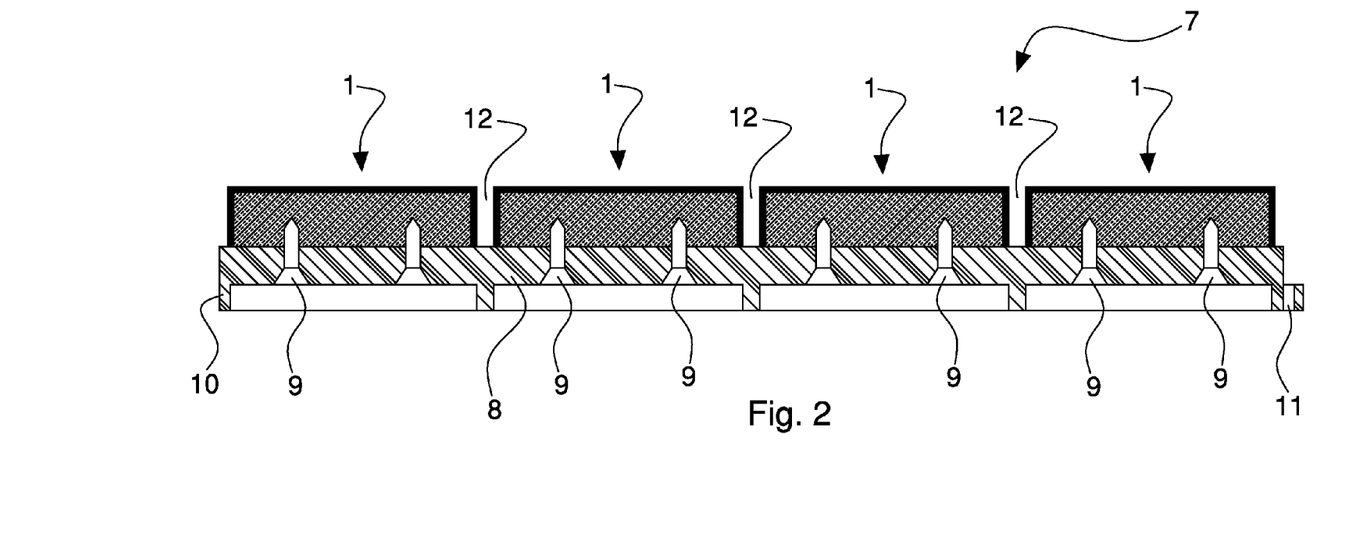
FIG. 2 is a schematic section of an example of a floor arrangement made by elements as that in FIG. 1.
Figure 3:
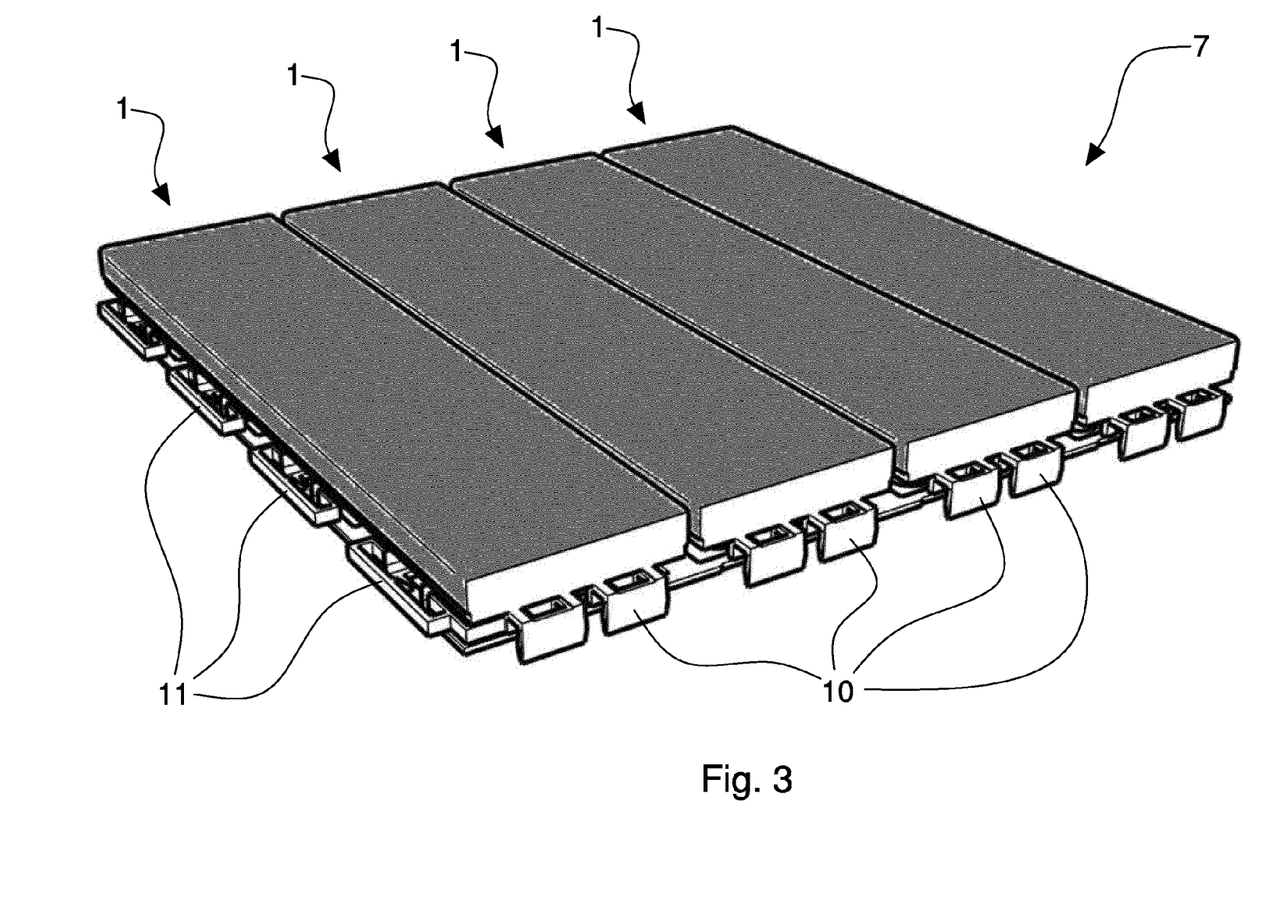
FIG. 3 is a perspective view of the example of floor arrangement shown by FIG. 2.
Figure 4:
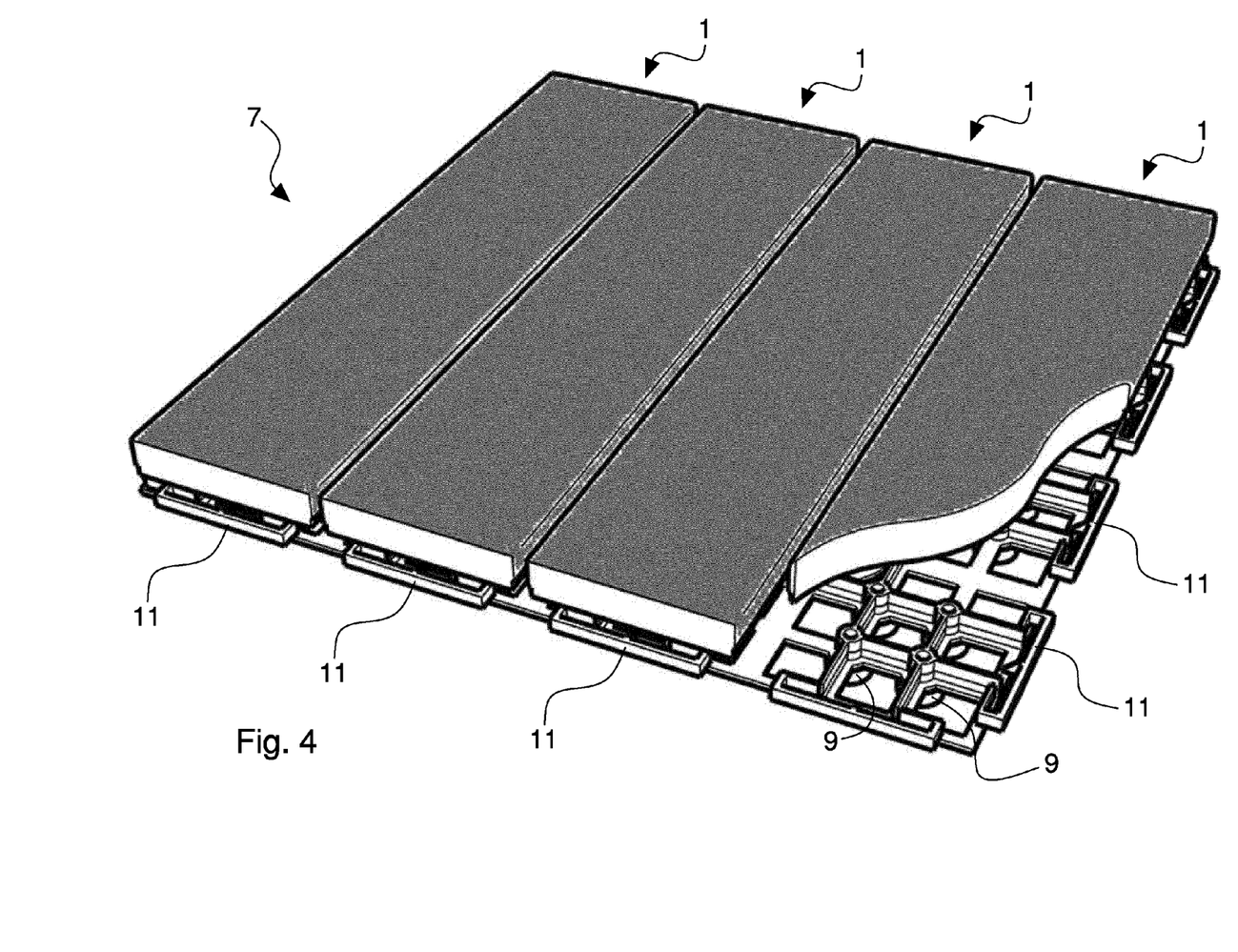
FIG. 4 is the floor arrangement of FIG. 3 in a different, partially sectioned, perspective view.

With reference to FIGS. 2 to 4, with 7 there has been indicated overall a floor arrangement formed by a prefabricated modular flooring tile. The tile 7 comprises a rigid support 8 and one or more prefabricated elements 1, 20 as above described. In the specific example, four prefabricated elements 1 are provided. However a different number (one, two, three, five or more) of prefabricated elements 1 may be provided. The prefabricated elements 1 are fixedly mounted on the rigid support 8, for example by a fastener arrangement, such as screws (steel screws 9 as in the specific example) or pins (for example expansion anchor pins). In particular the elements 1 is mounted on the rigid support 8 by a removable coupling arrangement. In particular the lower surface 4 of each prefabricated element 1 (wherein the layer of vinyl fabric is absent) is coupled to the rigid support 8.

The rigid support 8 comprises, as in this example, a modular support provided at one or more of its edges with a connecting arrangement for connection (in a removable manner) with other adjacent modular supports. The connecting arrangement comprises, as in the specific example, a groove-and-tongue joint, whereby the rigid support 8 will have at least one edge provided with a tongue 10 and at least one opposite edge provided with a groove 11 that can be coupled with the tongue of an adjacent modular tile.

The rigid support 8 comprises a lattice-shaped support made, for example, of plastics. The structure and shape of the (lattice-shaped) rigid support 8 comprises any structure and shape suitable for making the base on which the strips (lathes or splines) are fixed to manufacture a modular floor tile, in particular for outdoors.

The prefabricated elements 1 are adjacently arranged on the rigid support 8 so as to define a walkable surface of the tile. In particular a distance 12 between the lateral surfaces 5 of two adjacent elements 1 is provided. In particular a distance 12 between the lateral surfaces 5 of each pair of adjacent elements 1 is provided.

The tile 7 has any size and shape suitable for floors, for example square or rectangular shape, with size 300×300 mm or 300×600 mm, or other shapes and sizes.

Figure 5:
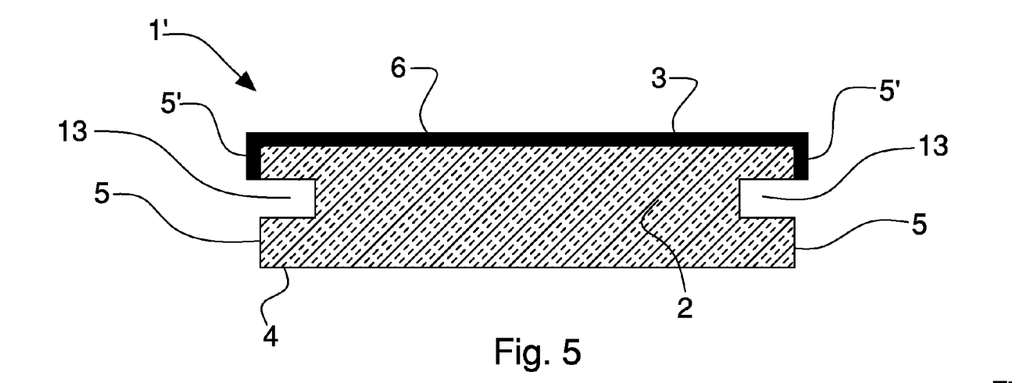
FIG. 5 is a schematic section of a further example of an element made according to the invention.
Figure 6:
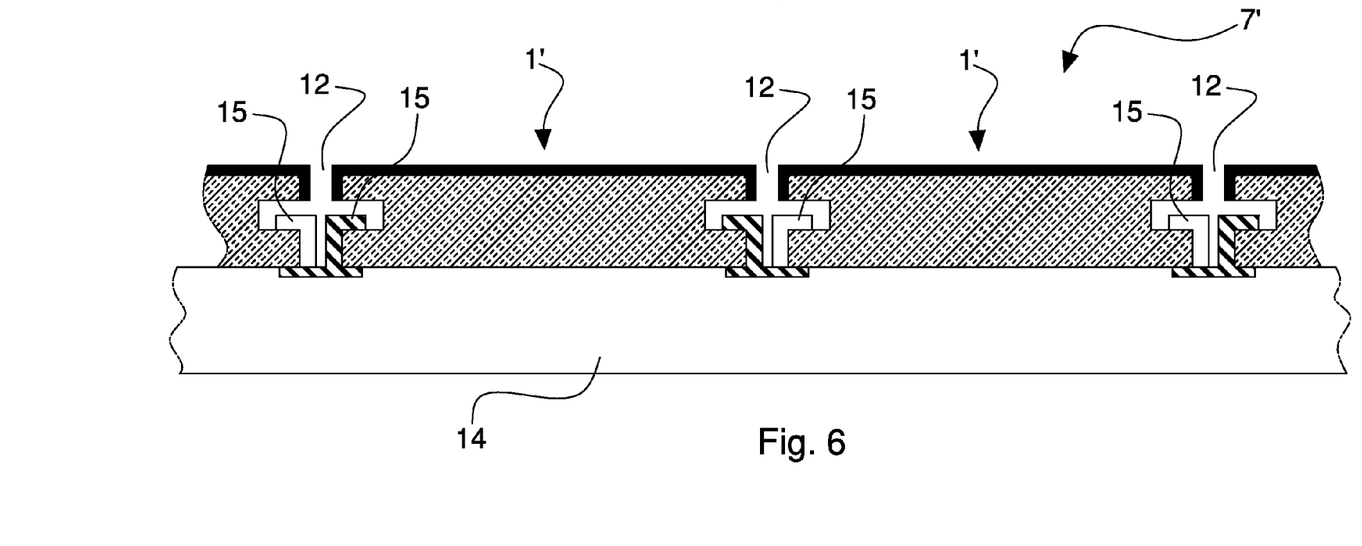
FIG. 6 is a schematic section of an example of a floor arrangement made by elements as that in FIG. 5.

With reference to FIG. 5, with 1' there has been indicated overall another example of prefabricated element for floors. The prefabricated element 1' comprises a base 2 and a layer 6 as those of the element 1, apart from the shape and/or the size. The element 1' comprises a connecting arrangement arranged at least one (at both in this case) of the two opposed lateral surfaces 5. Each connecting arrangement is located at a distance from the upper surface 3. Each connecting arrangement comprises a female connecting element, for example a longitudinal groove 13, obtained in the lateral surface 5. Each connecting arrangement is arranged to connect with an external rigid support 14 (see FIG. 6) by means of correspondent fastener arrangement (for example male connecting element such as one or more clips 15 emerging from the support 14 to couple with the groove 13 in order to fix the element 1' to the support 14). A portion 5' (upper portion) of each lateral surface 5 that is comprised between the connecting arrangement and the upper surface 3 is (at least partly) covered by the layer 6 made of vinyl fabric (as above described).

Figure 9:
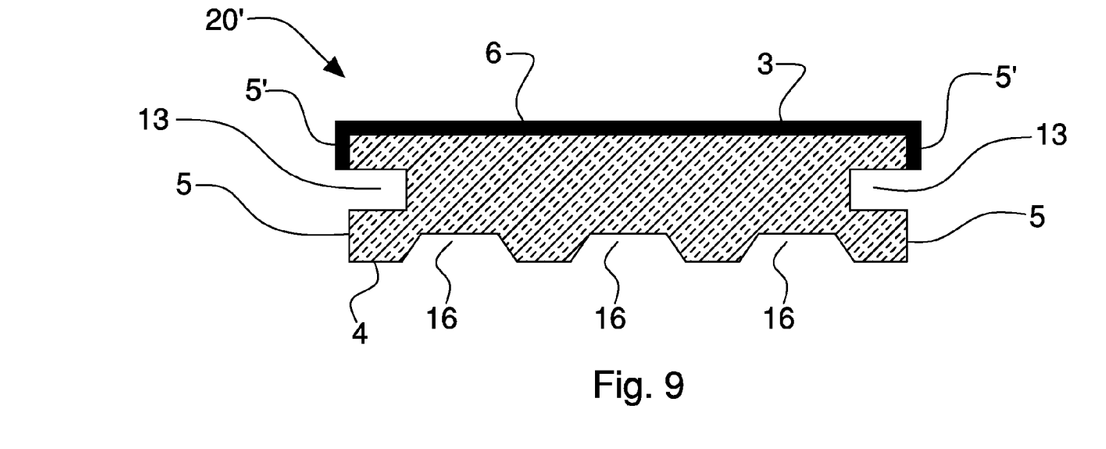
FIG. 9 is a schematic section of a version of the element shown in FIG. 5.

With reference to FIG. 9, with 20' there has been indicated overall a version of the prefabricated element 1' shown in FIG. 5. The prefabricated element 20' differs from the element 1' in that some further longitudinal grooves 16 are obtained in the lower surface 4. In the embodiment shown, the prefabricated element 20' comprises three longitudinal grooves 16 which are parallel one another and also parallel to the longitudinal groove 13 and to the lateral surface 5. The longitudinal grooves 16 have a cross section that is trapezoidal-shaped. Owing to the longitudinal grooves 16 the prefabricated element 20' is lighter than element 1' and can therefore be manufactured employing a reduced amount of material than the amount required for manufacturing element 1'. Accordingly, the prefabricated element 20' is manufactured by saving material and thus has a lower manufacturing cost. It is thus apparent for the person skilled in the art that the prefabricated element 20' may comprise a number of longitudinal grooves 16 different from three (e.g. one, two, four or even more grooves), which grooves 16 may have a cross section different from the trapezoidal one shown in the figure (e.g. prismatic or semi-circular cross shape).

Figure 7:
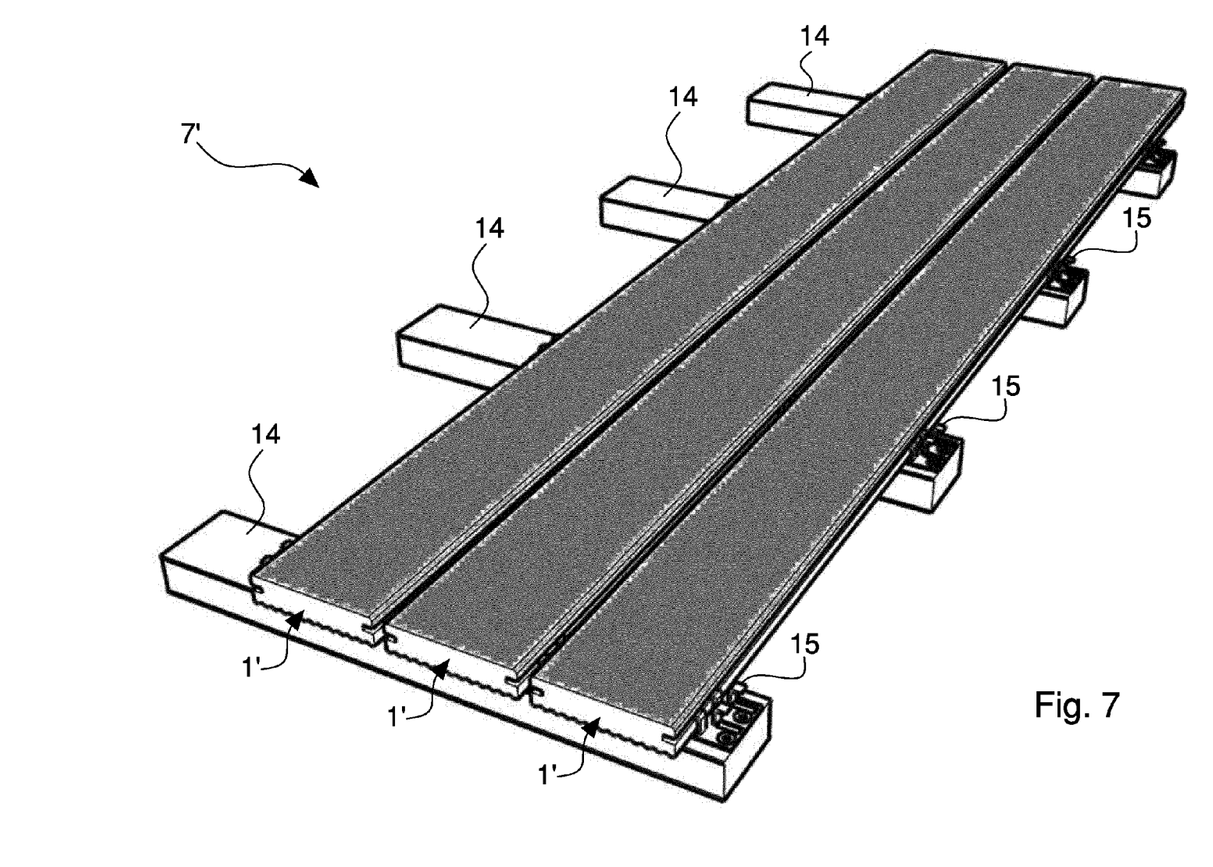
FIG. 7 is a perspective view of the example of floor arrangement shown by FIG. 6.

FIG. 7 shows an example of a floor arrangement 7' that comprises a plurality of elements 1' fixed to the external rigid support 14, which support 14 comprises a plurality of beams arranged at a distance (in parallel) one to another and transversally to the elements 1'. Alternatively, in an embodiment not shown, the floor arrangement 7' comprises a plurality of prefabricated elements 20' instead of elements 1'.

An exemplary method for manufacturing the element 1 or 1' or 20 or 20' comprises the following steps: applying an adhesive to the upper surface 3 and lateral surfaces 5 (or 5') of the rigid base 2; applying a layer 6 of vinyl tissue on the adhesive; and bonding the layer 6 (made of vinyl tissue) with the rigid base 2. For the element 1' (or 20') the adhesive will be applied to the upper portions 5' of the lateral surfaces 5 destined to be covered by the layer 6.

If necessary, the resulting unit may be cut to obtain the desired element(s) 1 or 1' or 20 or 20' for floors or floor baseboards. During the bonding step, the adhesive is relatively hot, such as for example a hot-melt adhesive at 120 to 160° C.

Another exemplary manufacturing method comprises the steps of placing the vinyl fabric in a mold and then introducing into the mold the material which will form the rigid base 2 so that upon cooling the layer 6 of vinyl fabric will remain firmly connected with the rigid base 2.

The layers 6 made of vinyl fabric shown by the annexed FIGS. 1 to 9 are only illustrative. In particular the layer 6 may have any desired pattern or design.

The above described elements 1, 1', 20 and 20', and arrangements 7 and 7' will achieve the following advantages: great resistance to outdoor conditions; versatility and flexibility for providing various and different patterns and designs for floors; reduction of the absorption of the impact sound; large dispersion of the sound waves in the ambient. The invention enables an outdoor decorated wood flooring with no need of maintenance to be realized.

The invention claimed is:

1. Floor arrangement comprising:
   a rigid support;
   two or more elements mounted on said rigid support, said two or more elements being adjacently arranged on said rigid support so as to define a distance between lateral surfaces of two adjacent elements, said two or more elements each are separate pieces;
   wherein each of said two or more elements comprises a rigid base having an uppermost surface, a lowermost surface and two opposed lateral surfaces connecting said uppermost surface with said lowermost surface;
   a first surface facing a second surface, the first surface is one of said two opposed lateral surfaces of a first one of said two or more elements, the second surface is one of said two opposed lateral surfaces of a second one of said two or more elements;
   wherein a single piece of a layer made of vinyl fabric covers at least partly said uppermost surface and the single piece of the layer includes at least two outermost surfaces each bounded at least in part by one of two most external lateral ends of said single piece of the layer and the two outermost surfaces at least partly cover said two opposed lateral surfaces;
   wherein said single piece of the layer is applied on adhesive applied to said uppermost surface and said two opposed lateral surfaces and the two outermost surfaces are adhered to said two opposed lateral surfaces by said adhesive; and
   a connecting arrangement arranged at one or both of said two opposed lateral surfaces at a distance from said uppermost surface for connection with said rigid support, a portion of said one or both of said two opposed lateral surfaces comprised between said connecting arrangement and said uppermost surface being at least partly covered by the layer made of vinyl fabric.

2. The arrangement of claim 1, wherein said rigid base is at least partly made of one or more of the materials selected in the group consisting of: wood, wood-plastic composites, natural fiber plastic composites, vinyl composition tile, composites of polyvinylchloride with or without fiber, acrylonitrile butadiene styrene, high-density fiberboard.

3. The arrangement of claim 1, wherein said yarns comprise an outer layer of plastics and a core of a plurality of said reinforcing threads.

4. The arrangement of claim 1, wherein said adhesive is a hot-melt adhesive.

5. The arrangement of claim 1, wherein one or more longitudinal grooves are obtained in at least one of said two opposed lateral surfaces.

6. The arrangement of claim 1, wherein said rigid support comprises a modular support provided at one or more of its edges with a connecting arrangement for connection with other adjacent modular supports.

7. The arrangement of claim 1, wherein said two or more elements are mounted on said rigid support by a fastener arrangement.

8. The arrangement of claim 7, wherein said fastener arrangement is provided on said rigid support for coupling with a connecting arrangement arranged at said two opposed lateral surfaces.

9. The arrangement of claim 7, wherein said fastener arrangement comprises screws or pins or clips.

10. The arrangement of claim 1, wherein said two or more elements are mounted on said rigid support by a removable coupling arrangement.

11. The arrangement of claim 1, wherein said rigid support comprises a lattice-shaped support.

12. The arrangement of claim 1, wherein said rigid support comprises a plurality of beams arranged transversally to said two or more elements.

13. The arrangement of claim 1, wherein said connecting arrangement comprises a female connecting element arranged at both of said two opposed lateral surfaces.

14. The arrangement of claim 1, wherein said yarns are made of polyvinylchloride and/or polyethylene and/or polypropylene.

15. The arrangement of claim 1 wherein said layer made of vinyl fabric comprises yarns made of plastics reinforced with threads made of glass fiber.

\* \* \* \* \*